United States Patent [19]

Hannas

[11] 4,352,993
[45] Oct. 5, 1982

[54] MULTIPLE POSITION POWER SWITCH

[75] Inventor: James R. Hannas, Thiensville, Wis.

[73] Assignee: Silent Running Corporation, Clearwater, Fla.

[21] Appl. No.: 300,691

[22] Filed: Sep. 9, 1981

[51] Int. Cl.³ .......................... H01H 9/30; H02P 1/24
[52] U.S. Cl. ..................................... 307/112; 318/729
[58] Field of Search ................. 307/38, 112; 318/729, 318/795

[56] References Cited

U.S. PATENT DOCUMENTS

| | | | |
|---|---|---|---|
| 1,707,423 | 4/1929 | Bailey | 318/795 |
| 1,707,424 | 4/1929 | Bailey | 318/795 |
| 1,726,230 | 8/1929 | Kennedy | 318/794 |
| 1,882,733 | 10/1932 | Ballman | 318/795 |
| 1,944,090 | 1/1934 | Lukens | 318/795 |
| 2,057,214 | 10/1936 | Sleeter et al. | 318/795 |
| 2,120,321 | 6/1938 | Bargdill | 318/794 |
| 2,648,808 | 8/1953 | Tiede | 318/814 |
| 3,478,222 | 11/1969 | Gassaway et al. | 307/38 |
| 3,543,139 | 11/1970 | Greene | 307/38 X |
| 4,181,844 | 1/1980 | Moretto | 307/157 |
| 4,187,457 | 2/1980 | Wanlass | 318/729 |
| 4,234,835 | 11/1980 | Ota et al. | 318/317 |

FOREIGN PATENT DOCUMENTS 546029  3/1977  U.S.S.R. ............................... 307/112

OTHER PUBLICATIONS

NASA Tech. Briefs, Summer 1980, pp. 133 & 134, Improved Power-Factor Controller.

Primary Examiner—Donald A. Griffin
Attorney, Agent, or Firm—Hill, Van Santen, Steadman, Chiara & Simpson

[57] ABSTRACT

A multiple position power control switch is connected in series with a load across a power source. A five position rotary switch permits the load to be selectively operated at four different power levels. The fifth position of the switch provides "OFF" operation. With the invention, component cost is reduced and power level control of a load is achieved with minimum power dissipation.

7 Claims, 4 Drawing Figures

POS. 4

POS. 3

POS. 2

MULTIPLE POSITION POWER SWITCH

BACKGROUND OF THE INVENTION

I. Field of the Invention

The invention relates to a multiple position power control switching system and more particularly to a power control system employing capacitors to change the power level at which a load such as a fan motor is operated.

II. Description of the Prior Art

It has been known to provide a series connection of a load with a capacitor in order to change the phase angle and thus power level at which a load is operated. Prior art systems required a large number of capacitors to achieve a full range of operational power levels, thus increasing cost.

SUMMARY OF THE INVENTION

It is an object of the invention to provide a multiple position power control switch system in which the number of capacitors utilized is minimized yet four distinct operational power levels may be provided to a load such as for a fan motor to be operated at four distinct speeds.

According to the invention, a five position single pull, throw switch has its common terminal connected to one side of the line. One of the five positions functions as an "OFF" position. Of the remaining four positions, a first provides direct operation of the fan across the power source. In a second position, four diodes are employed to parallel connect two capacitors which themselves are series connected with the fan across the power source. In a third position, one of the capacitors is connected in series with the fan across the power source. In a fourth position the other of the two capacitors is connected in series with the fan across the AC power source.

With the invention, four distinct operational power levels are achieved with only two capacitors. Maximum versatility at minimum cost is achieved.

DESCRIPTION OF THE PREFERRED EMBODIMENTS

Figure 1:
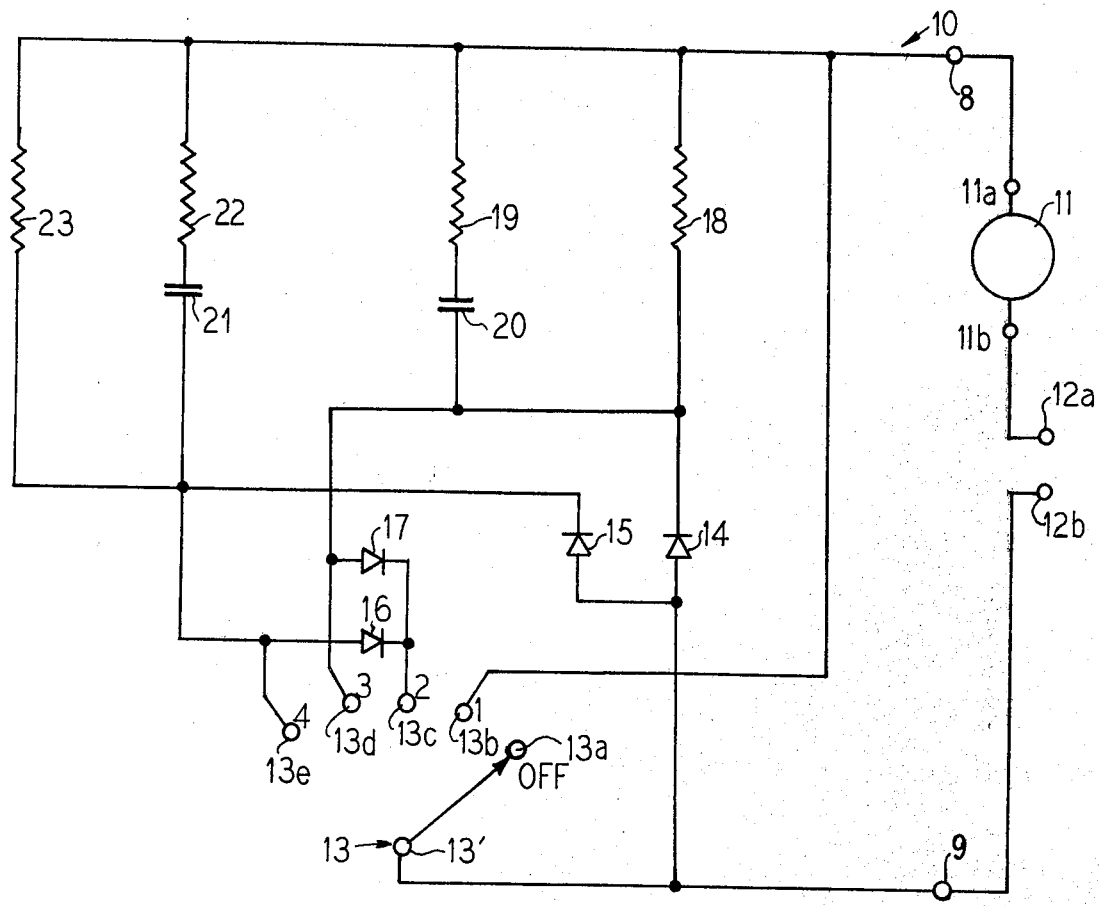
FIG. 1 is a schematic diagram of the multiple position power switching system of the invention.

As generally shown at 10 in FIG. 1, a multiple position power control switch system of the invention is employed to operate a load 11, preferably a fan, at four distinct power levels or speeds. A power source is connected at terminals 12a, 12b. One side of the load 11 at terminal 11b connects to terminal 12a. The other power source terminal 12b connects through output terminal 9 to the common terminal 13' of a five position switch 13. Preferably switch 13 is a rotary switch although other designs may also be employed. Switch position 13a corresponds to "OFF" operation and is not connected. Switch position 13b corresponding to a first power level position connects directly to terminal 11a of the load 11. Position 13c corresponding to a second operational power level position connects to the cathodes of diodes 16 and 17 whose anodes respectively connect to switch position 13e and 13d. The anode of diode 17 further connects to the series circuit of power level control capacitor 20 and surge resistor 19. A bleeder resistor 18 is connected across the series combination of resistor 19 and capacitor 20. The anode of diode 16 further connects to a series circuit formed by power level capacitor 21 and surge resistor 22. Bleeder resistor 23 is connected in parallel across this series circuit.

Switch position 13d connects to the anode of diode 17 and to capacitor 20.

Switch position 13e connects to the anode of diode 16 and also to capacitor 21.

The anodes of diodes 14 and 15 connect to the common terminal 13' of switch 13. The cathodes respectively connect to capacitor 20 and capacitor 21. Resistors 23, 22, 19 and 18 all are commonly connected through output terminal 8 to terminal 11a of load 11.

Figure 2C:
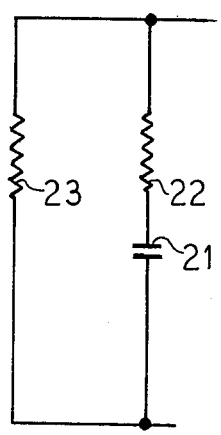
FIGS. 2a, 2b and 2c are equivalent circuit diagrams for three of the switch positions of the power control switch system of the invention.
Figure 2B:
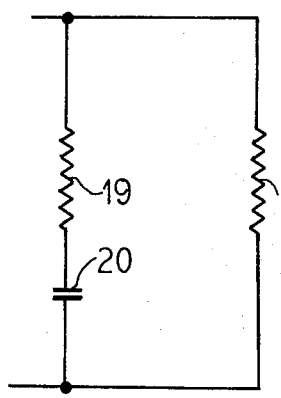
Figure 2A:
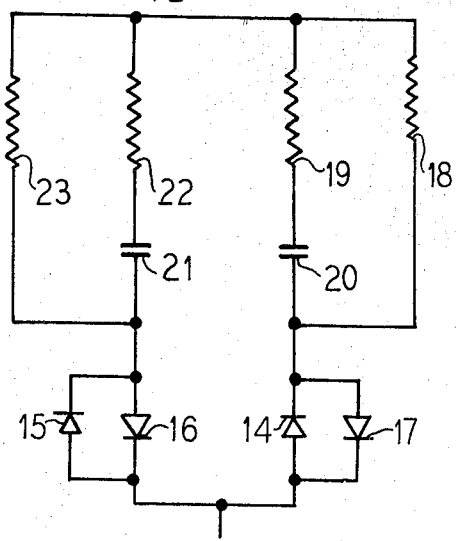

FIGS. 2a, 2b and 2c respectively show the equivalent circuits for the switch power level positions 2, 3 and 4 corresponding to switch terminals 13c, 13d and 13e.

With the invention, when switch 13 is in position 13a, no power is supplied to fan 11. In switch position 13b, the fan operates at full speed. In switch position 13c, the two capacitors are paralleled and AC current flows through them as shown in FIG. 2a since diode pairs 15, 16 and 14, 17 are connected back to back to permit full wave AC operation. This corresponds, for example, to ¾ speed operation of fan 11. In switch position 13d, capacitor 20 and surge resistor 19 permit ½ speed operation of fan 11. Capacitor 21 is effectively isolated from the circuit by diode 15 which, after charging of capacitor 21, is no longer forward biased.

In switch position 13e, capacitor 21, which typically has a smaller capacitance than capacitor 20, permits the fan 11 to operate at ¼ speed, for example. In this switch position, capacitor 20 is isolated from the circuit by diode 14 which is substantially non-conducting.

Accordingly, with the invention only two capacitors are employed, yet four speed operation is attained. By provision of surge limiting resistors 19 and 22, switch contact arcing is reduced and high switch contact reliability is achieved.

Although the invention has been described as applicable to the control of loads such as fan motors, it can also be used to control heater elements such as water heaters, ceiling heating elements, lights, ventilation mechanisms or any other type of apparatus to which power is to be selectively controlled.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A multiple position power control switch for series connection with a load to operate it at different power levels from a power source, comprising: first and second output points for connection to a series circuit comprised of the power source and load; a multiple position switch having a common terminal and at least four other selectively connectible terminals; the common terminal being connected to the first output point and further connecting to a first conductivity type region of first and second diodes; a first of the multiple position switch terminals connecting to the second output point; a second terminal of the switch connecting to second conductivity type regions of third and fourth diodes; a third position of the switch connecting to a first conductivity type region of the third diode and also to one end of a first capacitor whose other end is connected to the second output point; a fourth terminal of the switch connecting to a first conductivity type region of the fourth diode and also to one end of a second capacitor whose other end connects to the second output point; a second conductivity type region of the first diode connecting to the third switch terminal; and a second conductivity type region of the second diode connecting to the fourth terminal of the switch.

2. The switch of claim 1 wherein the switch is a five position switch whose fifth terminal is unconnected and provides an "OFF" position.

3. The switch of claim 1 wherein respective surge resistors are connected in series with the first and second capacitors.

4. The switch of claim 1 wherein bleeder resistors are connected across the first and second capacitors.

5. A fan control multiple position speed switch, comprising: first and second output points with a series circuit of a fan and AC power source connected therebetween; the first output point connecting to a common terminal of a five terminal position switch; a first terminal position of the switch being unconnected; a second terminal position of the switch connecting to the second output point; a third terminal position of the switch connecting through switching means to first and second capacitors which are further connected in series to the second output point; a fourth terminal position of the switch connecting to one end of a capacitor whose other end is connected to the second output point; a fifth terminal position of the switch connecting to one end of a second capacitor whose other end connects to the second output terminal; and said switching means parallel connecting the first and second capacitors to permit full wave AC to pass therethrough when the switch is in the third terminal position.

6. The switch of claim 5 wherein the switching means also isolates the second capacitor when the switch is in the fourth terminal position and isolates the first capacitor when the switch is in the fifth terminal position.

7. A multiple position fan control system, comprising: first and second output points connected to a series circuit comprised of a power source and a fan; a multiple position switch having a common terminal and at least four other selectively connectible terminals; the common terminal being connected to the first output point and further connecting to a first conductivity type region of first and second diodes; a first of the multiple position switch terminals connecting to the second output point; a second terminal of the switch connecting to second conductivity type regions of third and fourth diodes; a third position of the switch connecting to a first conductivity type region of the third diode and also to one end of a first capacitor whose other end is connected to the second output point; a fourth terminal of the switch connecting to a first conductivity type region of the fourth diode and also to one end of a second capacitor whose other end connects to the second output point; a second conductivity type region of the first diode connecting to the third switch terminal; and a second conductivity type region of the second diode connecting to the fourth terminal of the switch.

* * * * *